US010392049B2

(12) United States Patent
Sasaki et al.

(10) Patent No.: US 10,392,049 B2
(45) Date of Patent: Aug. 27, 2019

(54) POWER STEERING DEVICE AND CONTROL DEVICE FOR ON-BOARD DEVICE

(71) Applicant: HITACHI AUTOMOTIVE SYSTEMS, LTD., Hitachinaka-shi, Ibaraki (JP)

(72) Inventors: Mitsuo Sasaki, Hadano (JP); Kohtaro Shiino, Isehara (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 131 days.

(21) Appl. No.: 15/563,724

(22) PCT Filed: Mar. 25, 2016

(86) PCT No.: PCT/JP2016/059564
§ 371 (c)(1),
(2) Date: Oct. 2, 2017

(87) PCT Pub. No.: WO2016/163249
PCT Pub. Date: Oct. 13, 2016

(65) Prior Publication Data

US 2018/0093703 A1 Apr. 5, 2018

(30) Foreign Application Priority Data

Apr. 8, 2015 (JP) ................................ 2015-078828

(51) Int. Cl.
*B62D 5/04* (2006.01)
*B62D 6/10* (2006.01)

(52) U.S. Cl.
CPC .......... *B62D 5/049* (2013.01); *B62D 5/0463* (2013.01); *B62D 5/0484* (2013.01);
(Continued)

(58) Field of Classification Search
CPC ..... B62D 5/0457; B62D 5/0481; B62D 5/049
See application file for complete search history.

(56) References Cited

U.S. PATENT DOCUMENTS 7,275,619 B2 10/2007 Tokumoto
9,796,409 B2 * 10/2017 Sasaki .................... B62D 5/049
(Continued)

FOREIGN PATENT DOCUMENTS

JP 2005-186759 A 7/2005
JP 2007-190985 A 8/2007
(Continued)

*Primary Examiner* — Kevin Hurley
(74) *Attorney, Agent, or Firm* — Foley & Lardner LLP

(57) ABSTRACT

A CPU 38 is connected to a first judgment circuit 36 accommodated in a sensor housing 15 through a first signal line 44A and a second signal line 45A. The first judgment circuit 36 is connected to first to fourth torque detection elements 32*a*, 33*a*, 34*a* and 35*a* of a quadruple torque sensor 16 through first to fourth torque signal lines 46, 47, 48 and 49. Normal and abnormality of torque signals from the torque detection elements 32*a*, 33*a*, 34*a* and 35*a* are judged are judged by a predetermined judgment manner in the first judgment circuit 36. Then, two normal torque signals, which have been judged to be normal, are transmitted to the CPU 38 through the first signal line 44A and the second signal line 45A.

20 Claims, 6 Drawing Sheets

(52) U.S. Cl.
CPC ......... *B62D 5/0487* (2013.01); *B62D 5/0493* (2013.01); *B62D 6/10* (2013.01)

(56) References Cited

U.S. PATENT DOCUMENTS

| | | | |
|---|---|---|---|
| 2005/0156548 A1 | 7/2005 | Kawada | |
| 2013/0090813 A1 | 4/2013 | Kanekawa et al. | |
| 2018/0372513 A1* | 12/2018 | Cai | G01D 5/2053 |

FOREIGN PATENT DOCUMENTS

| | | | |
|---|---|---|---|
| JP | 2015-054629 | A | 3/2015 |
| WO | WO-03/078237 | A1 | 9/2003 |
| WO | WO-2011/158876 | A1 | 12/2011 |
| WO | WO-2015/040960 | A1 | 3/2015 |
| WO | WO-2015/125617 | A1 | 8/2015 |

* cited by examiner

POWER STEERING DEVICE AND CONTROL DEVICE FOR ON-BOARD DEVICE

TECHNICAL FIELD

The present invention relates to a power steering device and a control device for an on-board device (a vehicle-mounted device), which are applied to a vehicle.

BACKGROUND ART

Patent Document 1 discloses an electric power steering device having a plurality of sensors at a steering shaft. In this electric power steering device, a plurality of signals concerning the steering shaft detected by the plurality of sensors are read at the same time in a CPU in a control device (ECU). Then, by comparing these signals, an abnormality signal is detected.

CITATION LIST

Patent Document

Patent Document 1: Japanese Unexamined Patent Application Publication No. JP2005-186759

SUMMARY OF THE INVENTION

Technical Problem

In such configuration of the electric power steering device disclosed in Patent Document 1, however, since the CPU is required to input the plurality of signals and detect the abnormality signal and so on, there is a risk that an operation load of the CPU will be increased.

In addition, there has been a tendency to mount more sensors by and according to an increasingly multifunctional device in recent years. In such cases, the operation load of the CPU is increased more, then a high-performance CPU (an increase in performance of the CPU) and a large-sized CPU will be required.

Solution to Problem

In the present invention, in particular, a second microprocessor is provided between a steering state detection unit and a control device. And, in the second microprocessor, a first signal, a second signal and a third signal from the steering state detection unit are inputted to a first judgment circuit, and the first judgment circuit judges whether the first signal, the second signal and the third signal are normal or abnormal by comparing the first signal, the second signal and the third signal.

Effects of Invention

According to the present invention, after a normal and abnormality judgment of the first signal, the second signal and the third signal is previously made at an upstream side with respect to an electric motor drive first microprocessor, the first microprocessor controls and drives an electric motor on the basis of a signal which have been judged to be normal, thereby lightening an operation load of the first microprocessor and improving safety of the device.

That is, by the fact that an external unit to the first microprocessor previously makes the normal and abnormality judgment of the signal, which is usually made by the first microprocessor, the operation load of the first microprocessor is lightened.

EMBODIMENTS FOR CARRYING OUT THE INVENTION

In the following description, embodiments of a power steering device of the present invention will be explained with reference to the drawings.

Figure 1:
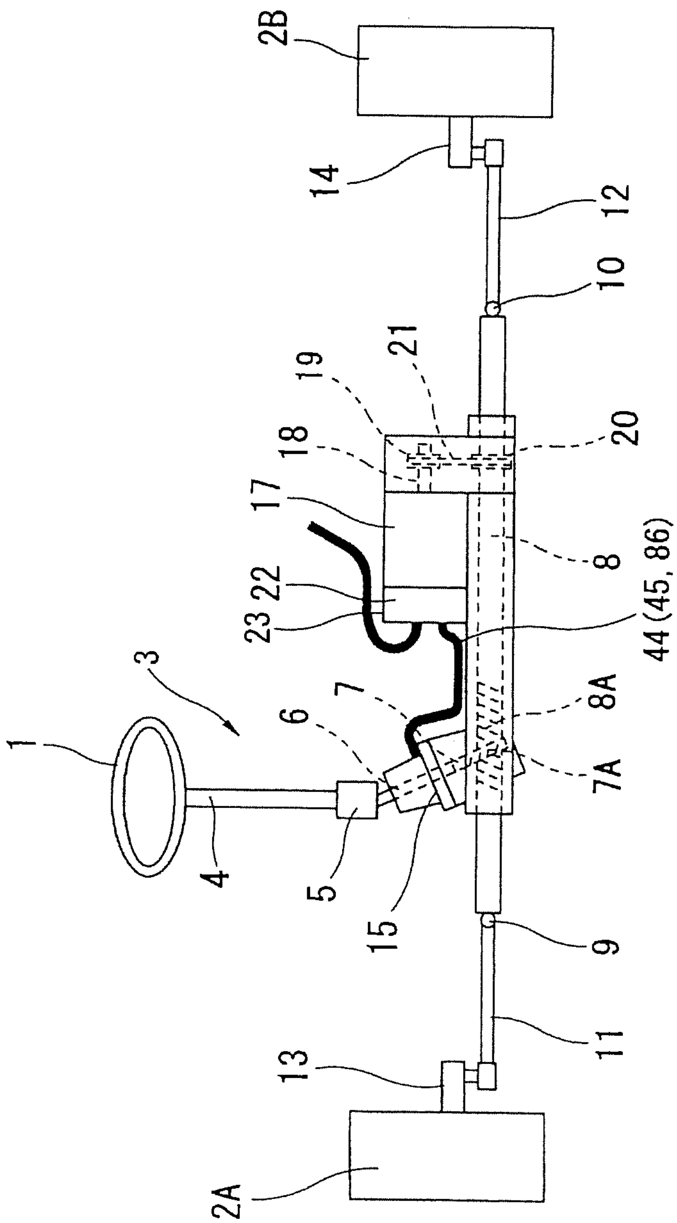
FIG. 1 is a schematic diagram of a power steering device of the present invention.

As shown in FIG. 1, a steering wheel 1 disposed in driver's cabin of a vehicle and steered wheels 2A and 2B that are front wheels of the vehicle are mechanically connected through a steering mechanism 3. The steering mechanism 3 has a steering shaft 6 connected to the steering wheel 1 through a middle shaft 4 and a universal joint 5 so as to rotate integrally with the steering wheel 1, a pinion shaft 7 coupled to the steering shaft 6 through a torsion bar (not shown), and a rack bar 8 provided at an outer periphery thereof with a rack 8A that is engaged with a pinion 7A provided at an outer periphery of the pinion shaft 7. Further, the steered wheels 2A and 2B are coupled to both end portions of the rack bar 8 through ball joints 9 and 10, tie rods 11 and 12 and knuckle arms 13 and 14 respectively.

With this configuration, when a driver rotates the steering wheel 1, the middle shaft 4 and the steering shaft 6 rotate on their axes by and according to this rotation operation, and the torsion bar is twisted. Then, by an elastic force of the torsion bar which is generated by the twist of the torsion bar, the pinion shaft 7 rotates while responding to the steering shaft 6. Further, a rotation movement of the pinion shaft 7 is converted to a linear motion (a linear movement) along an axial direction of the rack bar 8 by a rack-and-pinion mechanism formed by the rack 8A and the pinion 7A, and the knuckle arms 13 and 14 are pulled in a vehicle width direction through the ball joints 9 and 10 and the tie rods 11 and 12, then directions of the steered wheels 2A and 2B are changed.

Here, a sensor housing 15 accommodating therein the steering shaft 6 and the pinion shaft 7 is provided with, as sensors detecting each information, a steering angle sensor (not shown) that detects a steering angle of the steering shaft 6 and an after-mentioned quadruple torque sensor (or a quadruplex torque sensor) 16 (FIG. 3) that is a steering state detection unit and detects a steering torque (a steering state) inputted to the steering shaft 6 on the basis of a relative rotation angle difference between the steering shaft 6 and the pinion shaft 7 by the twist of the torsion bar.

The sensor housing 15 corresponds to a "second housing" recited in scope of claim.

An electric motor 17 that provides a steering force to the steering mechanism 3 is coupled to the rack bar 8 by connection of an input pulley 19 fixed to a top end outer circumference of an output shaft 18 of the electric motor 17 with an output pulley 20 fixed to an outer circumference of the rack bar 8 through a belt 21. A ball screw mechanism (not shown) that is a speed reducer is interposed between the output pulley 20 and the rack bar 8.

A control device (ECU) 22 as a control unit is formed integrally with the electric motor 17. The control device (ECU) 22 has the function of storing and executing various control operations, and on the basis of information of the steering angle and the steering torque, controls drive of the electric motor 17 providing a steering assist torque to the steering mechanism 3. The control device 22 is accommodated in a control device housing 23.

The control device housing 23 corresponds to a "first housing" recited in scope of claim.

Figure 2:
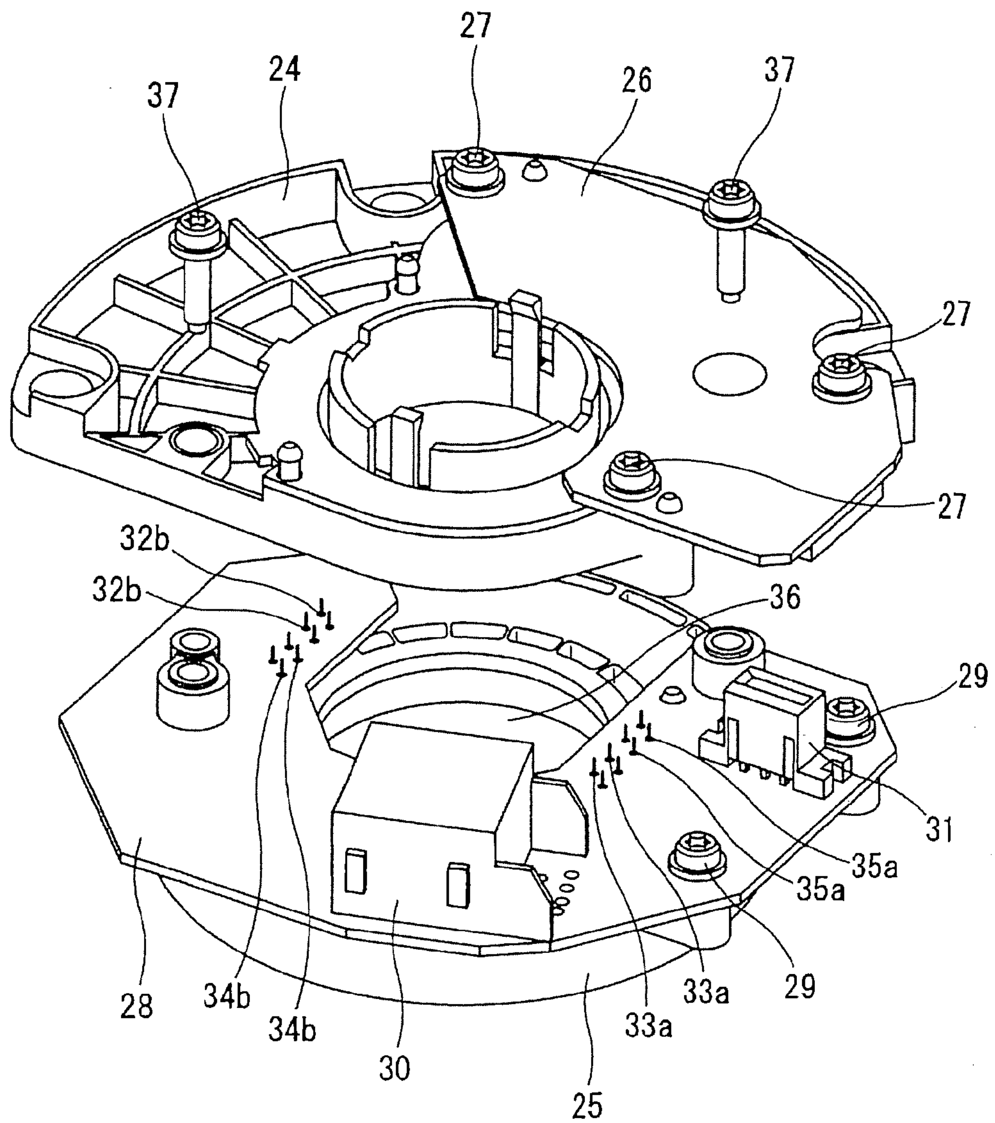
FIG. 2 is a perspective exploded view of a sensor housing of FIG. 1.

As shown in FIG. 2, the sensor housing 15 has a sector-shaped steering angle sensor case 24 and a circular torque sensor case 25 arranged at a lower side of this steering angle sensor case 24.

A steering angle sensor circuit board 26 is fixed to the steering angle sensor case 24 with three screws 27.

On the other hand, a torque sensor circuit board 28 is fixed to the torque sensor case 25 with two screws 29. The above-mentioned quadruple torque sensor 16, a sensor side connector 30 connected to a connector (not shown) provided on the control device 22 side through a harness and a board connecting connector 31 for connecting the steering angle sensor circuit board 26 to the torque sensor circuit board 28 are mounted on the torque sensor circuit board 28. The quadruple torque sensor 16 has first to fourth torque detection elements 32*a*, 33*a*, 34*a* and 35*a* (see FIG. 3) having the same configuration as a Hall IC that detects, for instance, magnetic field (magnetic flux) and connecting terminals 32*b*, 33*b*, 34*b* and 35*b*, each of which has aligned four terminals (i.e. total 16 terminals) protruding from the respective detection elements. The quadruple torque sensor 16 having this configuration is connected to the torque sensor circuit board 28 so that a pair of torque detection elements 32*a* and 34*a* and a pair of torque detection elements 33*a* and 35*a* are arranged at both sides of a center shaft hole 36, which the steering shaft 6 penetrates, on a back side (facing the torque sensor case 25) of the torque sensor circuit board 28, and also, as shown in the drawing, the eight connecting terminals 32*b*, 32*b*, 32*b*, 32*b* and 34*b*, 34*b*, 34*b*, 34*b* of the torque detection elements 32*a* and 34*a*, which form two lines, and the eight connecting terminals 33*b*, 33*b*, 33*b*, 33*b* and 35*b*, 35*b*, 35*b*, 35*b* of the torque detection elements 33*a* and 35*a*, which form two lines, penetrate the torque sensor circuit board 28 from the back side to a front side of the torque sensor circuit board 28. Output signals from the torque detection elements 32*a*, 33*a*, 34*a* and 35*a* are used for calculation (computation) of a motor command signal. Further, an after-mentioned microprocessor (a second microprocessor) that is an after-mentioned first judgment circuit 36 having a self-judgment function that judges, at an upstream side with respect to the control device 22, whether torque signals detected by the first to fourth torque detection elements 32*a*, 33*a*, 34*a* and 35*a* are normal or abnormal is mounted on the back side of the torque sensor circuit board 28.

In this manner, the steering angle sensor circuit board 26 is fixed to the steering angle sensor case 24, and the torque sensor circuit board 28 is fixed to the torque sensor case 25, then the steering angle sensor case 24 is secured to the torque sensor case 25 with two screws 37.

Next, a first embodiment of the power steering device of the present invention will be explained with reference to FIG. 3.

Figure 3:
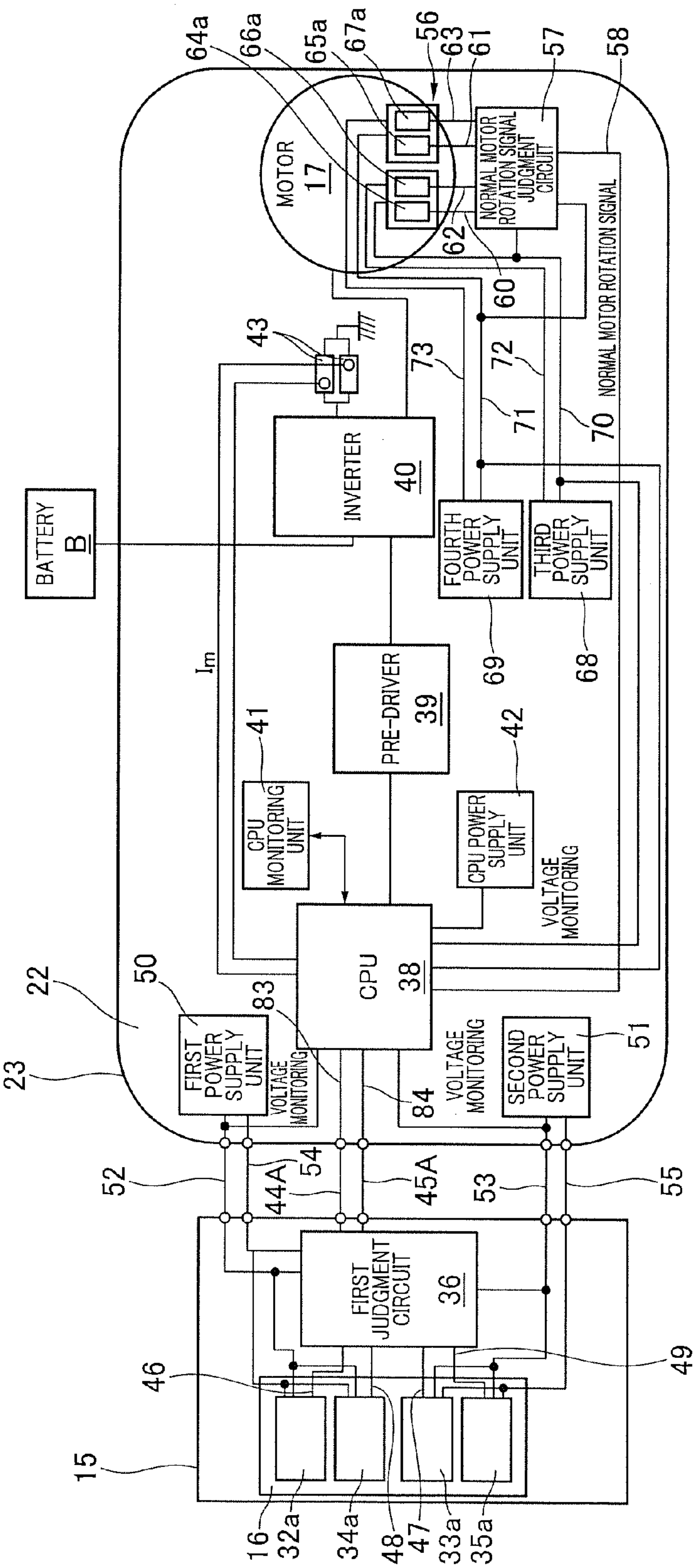
FIG. 3 is a system block diagram of the power steering device according to a first embodiment of the present invention.

As shown in FIG. 3, the control device 22 has a CPU 38 (a first microprocessor) that calculates the command signal to the electric motor 17 on the basis of the torque signals from the quadruple torque sensor 16, a pre-driver 39 that is an integrated circuit (IC) inputting the command signal from the CPU 38, and an inverter 40 that is driven and controlled according to a command signal from the pre-driver 39 and converts power of a battery B as a power supply from DC to AC then supplies it to the electric motor 17. A CPU monitoring unit 41 that monitors or checks the CPU 38 and a CPU power supply unit 42 that supplies power to the CPU 38 are connected to the CPU 38.

Further, by a motor current detection unit 43 provided at the inverter 40, a motor current Im that is current actually flowing to the electric motor 17 is returned to the CPU 38.

The CPU 38 is connected to the first judgment circuit 36 accommodated in the sensor housing 15, which is a separate housing from the control device housing 23 and is arranged at an upstream side with respect to the control device housing 23, through a first signal line (a torque signal transmission line) 44A and a second signal line (a torque signal transmission line) 45A. The first judgment circuit 36 is connected to the first to fourth torque detection elements 32*a*, 33*a*, 34*a* and 35*a* of the quadruple torque sensor 16 accommodated in the same sensor housing 15 through first to fourth torque signal lines 46, 47, 48 and 49. Therefore, the first judgment circuit 36 is provided between the first to fourth torque detection elements 32*a*, 33*a*, 34*a* and 35*a* and the control device 22. Here, the torque detection elements of the quadruple torque sensor 16 are arranged so that the first torque detection element 32*a* and the third torque detection element 34*a* are a pair of torque detection elements, and the second torque detection element 33*a* and the fourth torque detection element 35*a* are a pair of torque detection elements.

The control device 22 has a first power supply unit 50 that supplies power from a first power supply (not shown) and a second power supply unit 51 that supplies power from a second power supply (not shown) that is different from the first power supply. The first power supply unit 50 is connected to the first judgment circuit 36, the first torque detection element 32*a* and the third torque detection element 34*a* through a first power supply line 52. The second power supply unit 51 is connected to the first judgment circuit 36, the second torque detection element 33*a* and the fourth torque detection element 35*a* through a second power supply line 53. Therefore, the two power supply lines 52 and 53 are provided between the first power supply unit 50 and the second power supply unit 51.

The first power supply unit 50 is connected to the first judgment circuit 36, the first torque detection element 32*a* and the third torque detection element 34*a* through a first ground line 54 for earth or ground. The second power supply unit 51 is connected to the second torque detection element 33*a* and the fourth torque detection element 35*a* through a second ground line 55 for earth or ground.

Further, in the present embodiment, a quadruple motor rotation sensor (a quadruplex motor rotation sensor) 56 that detects a rotation speed of the electric motor 17 is provided in the control device 22. Regarding this quadruple motor rotation sensor 56, in the same manner as the quadruple torque sensor 16 side, in order to make normal and abnormality judgment at an upstream side, a normal motor rotation signal judgment circuit 57 is disposed at a position closer to the quadruple motor rotation sensor 56, and first to fourth motor rotation detection elements 64*a*, 65*a*, 66*a* and 67*a* are connected to the normal motor rotation signal judgment circuit 57 through first to fourth motor rotation lines 60, 61, 62 and 63. The normal motor rotation signal judgment circuit 57 is connected to the CPU 38 through a motor rotation signal transmission line 58. Since the motor rotation speed correlates with the steering torque, the quadruple motor rotation sensor 56 corresponds to the "steering state detection unit" recited in scope of claim.

Here, the normal motor rotation signal judgment circuit 57 and the CPU 38 could be connected by two signal transmission lines.

Further, in the same manner as the power supply to the quadruple torque sensor 16 side, the control device 22 is provided with a third power supply unit 68 and a fourth power supply unit 69. These power supply units 68 and 69 are connected to the normal motor rotation signal judgment circuit 57 and the corresponding first to fourth motor rotation detection elements 64*a*, 65*a*, 66*a* and 67*a* through a third power supply line 70 and a fourth power supply line 71.

The third power supply unit 68 is connected to the first and third motor rotation detection elements 64*a* and 66*a* through a third ground line 72. On the other hand, the fourth power supply unit 69 is connected to the second and fourth motor rotation detection elements 65*a* and 67*a* through a fourth ground line 73.

Figure 4:
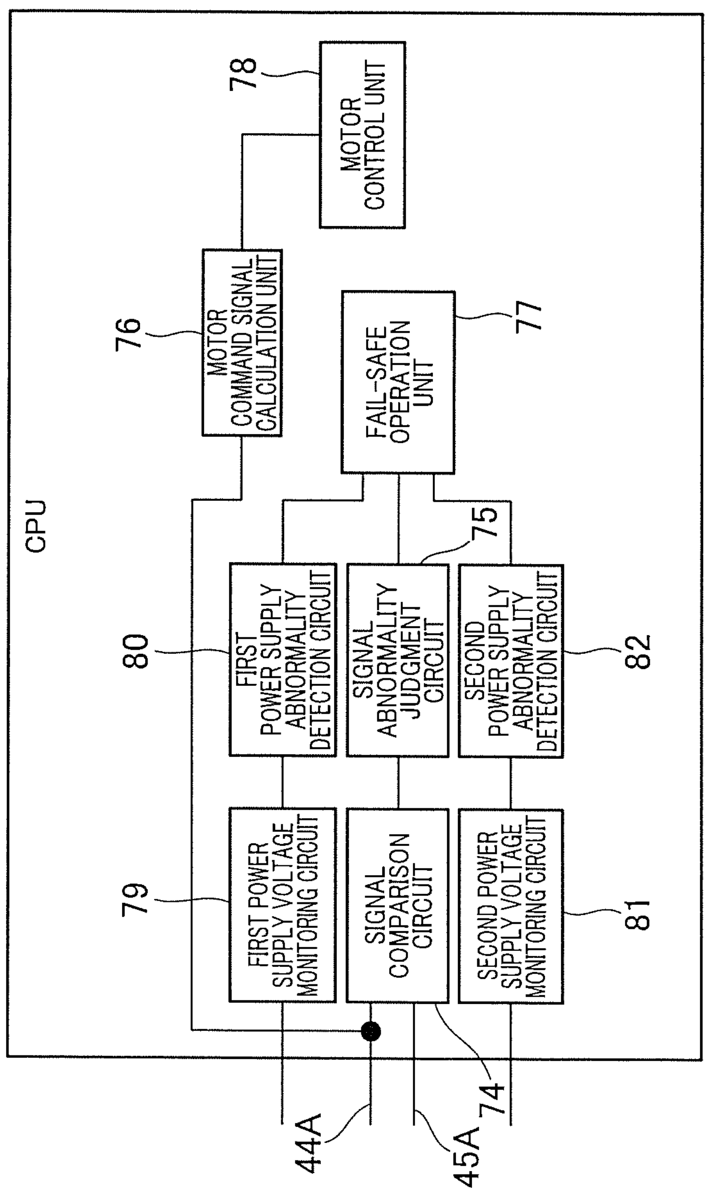
FIG. 4 is a function block diagram of CPU of FIG. 3.

Next, FIG. 4 is a function block diagram of the CPU 38 of FIG. 3.

The CPU 38 has a signal comparison circuit 74 that compares after-mentioned first normal torque signal $Trn_1$ and second normal torque signal $Trn_2$ transmitted from the first judgment circuit 36 through the first signal line 44A and the second signal line 45A, a signal abnormality judgment circuit 75 that judges abnormality of the torque signal on the basis of a comparison result of the normal torque signals $Trn_1$ and $Trn_2$ in the signal comparison circuit 74, a fail-safe operation unit 77 that when judged that the torque signal is abnormal in the signal abnormality judgment circuit 75, shifts a mode to a predetermined fail-safe mode that does not depend on the first normal torque signal $Trn_1$, a motor command signal calculation unit 76 that calculates the command signal that is a target to control the electric motor 17 on the basis of the first normal torque signal $Trn_1$, and a motor control unit 78 that controls and drives the electric motor 17 by the command signal. The electric motor 17 is controlled by the motor control unit 78 through the pre-driver 39.

Further, the CPU 38 has a first sensor power supply voltage monitoring circuit 79 that monitors voltage from the first power supply unit 50, a first power supply abnormality detection circuit 80 that judges the abnormality of the first power supply on the basis of the voltage monitored by the first sensor power supply voltage monitoring circuit 79, a second sensor power supply voltage monitoring circuit 81 that monitors voltage from the second power supply unit 51, and a second power supply abnormality detection circuit 82 that judges the abnormality of the second power supply on the basis of the voltage monitored by the second sensor power supply voltage monitoring circuit 81. In a case where the abnormality of the first power supply is judged by the first power supply abnormality detection circuit 80 or the abnormality of the second power supply is judged by the second power supply abnormality detection circuit 82, the abnormality of the power supply is transmitted to the fail-safe operation unit 77. This fail-safe operation unit 77 is configured to interrupt the power supply from the abnormal power supply and continue the normal and abnormality judgment of the torque signal by the power supply from no-abnormal power supply (the power supply having no abnormality).

Here, the first and second sensor power supply voltage monitoring circuits 79 and 81 also monitor voltages from the third and fourth power supply units 68 and 69 in addition to the monitoring of the voltages from the first and second power supply units 50 and 51.

Next, the normal and abnormality judgment of the torque signal in the first embodiment will be explained with reference to FIG. 3 again.

First, first and third torque signals $Tr_1$ and $Tr_3$ detected by the pair of first and third torque detection elements 32*a* and 34*a* at an upper side in the drawing (FIG. 3) are each inputted to the first judgment circuit 36, and an absolute value $D_1$ (hereinafter, called "signal difference $D_1$") of a difference between these torque signals $Tr_1$ and $Tr_3$ is calculated. Then, the first judgment circuit 36 compares this signal difference $D_1$ with a predetermined first threshold value $\alpha$. If the signal difference $D_1$ is smaller than the first threshold value $\alpha$, it is judged that both of the first and third torque signals $Tr_1$ and $Tr_3$ are normal. On the other hand, if the signal difference $D_1$ is equal to or greater than the first threshold value $\alpha$, it is judged that either one of the first or third torque signals $Tr_1$ or $Tr_3$ is abnormal.

Likewise, second and fourth torque signals $Tr_2$ and $Tr_4$ detected by the pair of second and fourth torque detection elements 33*a* and 35*a* at a lower side in the drawing (FIG. 3) are each inputted to the first judgment circuit 36, and an absolute value $D_2$ (hereinafter, called "signal difference $D_2$") of a difference between these torque signals $Tr_2$ and $Tr_4$ is calculated. Then, the first judgment circuit 36 compares this signal difference $D_2$ with the predetermined first threshold value $\alpha$. If the signal difference $D_2$ is smaller than the first threshold value $\alpha$, it is judged that both of the second and fourth torque signals $Tr_2$ and $Tr_4$ are normal. On the other hand, if the signal difference $D_2$ is equal to or greater than the first threshold value $\alpha$, it is judged that either one of the second or fourth torque signals $Tr_2$ or $Tr_4$ is abnormal.

Here, in the present embodiment, the two torque detection elements 32*a* and 34*a* at the upper side are compared, and the two torque detection elements 33*a* and 35*a* at the lower side are compared. However, arbitrary two torque detection elements could be compared.

For instance, if the signal difference $D_1$ is smaller than the first threshold value $\alpha$ and the signal difference $D_2$ is equal to or greater than the first threshold value $\alpha$, both of the first and third torque signals $Tr_1$ and $Tr_3$ are outputted as the normal torque signals $Trn_1$ and $Trn_2$ to corresponding first and second output signal receiving units 83 and 84 in the control device 22 through the first and second signal lines 44A and 45A. At this time, the second and fourth torque signals $Tr_2$ and $Tr_4$, either one of which is the abnormal torque signal, are not used.

Here, in the above case, by comparing the first and third torque signals $Tr_1$ and $Tr_3$ which have been judged to be the normal torque signals with the second and fourth torque signals $Tr_2$ and $Tr_4$, either one of which is the abnormal torque signal, the abnormal torque signal could be determined, then either one of the first and third torque signals $Tr_1$ and $Tr_3$ and the other of the second and fourth torque signals $Tr_2$ and $Tr_4$ which is judged to be normal could be outputted as the first and second normal torque signals $Trn_1$ and $Trn_2$ to the first and second output signal receiving units 83 and 84 through the first and second signal lines 44A and 45A.

Further, in a case where three or more detection elements are provided, since the abnormal torque signal can be determined by majority operation, the torque signal from the abnormal torque detection element is removed, then arbitrary two torque signals from the remaining normal torque detection elements can be selected and outputted as the first and second normal torque signals $Trn_1$ and $Trn_2$ to the first and second output signal receiving units 83 and 84 through the first and second signal lines 44A and 45A.

The first and second normal torque signals $Trn_1$ and $Trn_2$ outputted to the CPU 38 are compared in the signal comparison circuit 74, and an absolute value $D_3$ (hereinafter, called "signal difference $D_3$") of a difference between these torque signals $Trn_1$ and $Trn_2$ is calculated. Then, this signal difference $D_3$ is compared with a predetermined second threshold value β. If the signal difference $D_3$ is smaller than the second threshold value β, it is judged that both of the first and second normal torque signals $Trn_1$ and $Trn_2$ remain as normal states (normal values) , then the first normal torque signal $Trn_1$ is outputted to the motor command signal calculation unit 76. On the other hand, if the signal difference $D_3$ is equal to or greater than the second threshold value β, the signal abnormality judgment circuit 75 judges that noise is generated in either one of the first and second normal torque signals $Trn_1$ and $Trn_2$ or judges that an abnormality occurs in the torque signal and/or the signal line due to a break of either one of the first and second signal lines 44A and 45A, then sends this abnormality information to the fail-safe operation unit 77. The fail-safe operation unit 77 then stops the first normal torque signal $Trn_1$ from being outputted to the motor command signal calculation unit 76, and also executes a predetermined fail-safe operation.

Here, as the second threshold value β at the control device 22 side, the same value as the first threshold value α at the quadruple torque sensor 16 side could be used. However, the second threshold value β is not necessarily the same value as the first threshold value α. The second threshold value β could be a different value from the first threshold value α.

As described above, after the normal and abnormality judgment of the first to fourth torque signals $Tr_1$, $Tr_2$, $Tr_3$ and $Tr_4$ is previously made at the upstream side with respect to the electric motor drive CPU 38, the CPU 38 controls and drives the electric motor 17 on the basis of the torque signals $Trn_1$ and $Trn_2$ which have been judged to be normal, thereby lightening an operation load of the CPU 38 and improving safety of the device.

That is, by the fact that an external unit to the CPU 38 previously makes the normal and abnormality judgment of the signal, which is usually made by the CPU 38, the operation load of the CPU 38 is lightened.

Further, since the first judgment circuit 36 is provided at an upstream side with respect to the signal lines 44A and 45A, there is no need to make the normal and abnormality judgment of the first to fourth torque signals $Tr_1$, $Tr_2$, $Tr_3$ and $Tr_4$ at the CPU 38 side. Further, there is no need to transmit all of the first to fourth torque signals $Tr_1$, $Tr_2$, $Tr_3$ and $Tr_4$ by using corresponding signal lines for the judgment. Therefore, the number of lines that connect the sensor housing 15 and the control device housing 23 can be reduced.

Furthermore, if the control device that judges a state of the signal by the CPU 38 and the detection element of the sensor are connected to each other, three lines (the signal line, the power supply line, and the ground line) are necessary for each detection element. For instance, if four detection elements and the control device are connected to each other, a total of twelve lines are necessary. Therefore, as described above, in the configuration in which the quadruple torque sensor 16, the quadruple motor rotation sensor 56 side and the CPU 38 side are connected to each other, these can be connected by five or six lines, thereby greatly reducing the number of the lines and achieving size reduction of the connector at the control device 22 side.

Moreover, since the two lines formed by the first signal line 44A and the second signal line 45A are used, even if an abnormality occurs at one of the two signal lines, the signal can be transmitted by the other signal line.

Additionally, since the power is supplied to the corresponding detection elements 32*a*, 33*a*, 34*a* and 35*a* and the first judgment circuit 36 in the sensor housing 15 by two systems formed by the first power supply unit 50 and the second power supply unit 51, even if one of the power supply units fails and the power supply is interrupted, the power can be supplied by the other power supply unit, then the torque detection and the signal judgment in the first judgment circuit 36 can be continued.

Further, since the pair of first and third torque detection elements 32*a* and 34*a* and another pair of second and fourth torque detection elements 33*a* and 35*a* are supplied with the power by the different power supplies of the first power supply and the second power supply respectively, even if an abnormality occurs at one of the power supplies, by supplying the power by the other power supply, the control of the power steering device can be continued.

In addition, the abnormality of the power supply is detected using the first power supply abnormality detection circuit 80 and the second power supply abnormality detection circuit 82 of the control device (the CPU 38). Therefore, safety measures such as adoption of the signal from the torque detection element driven by the normal power supply as a motor control signal and interruption of the power supply from the abnormal power supply can be taken.

Moreover, in the present embodiment, the first normal torque signal $Trn_1$ is transmitted through the first signal line 44A and the second normal torque signal $Trn_2$ is transmitted through the second signal line 45A. With this, since a possibility that an abnormality occurs at both of the first normal torque signal $Trn_1$ and the first signal line 44A at the same time or an abnormality occurs at both of the second normal torque signal $Trn_2$ and the second signal line 45A at the same time is extremely low, by transmitting the signal by the above combination, it is possible to improve safety of the device while reducing a transmission load.

Furthermore, in the present embodiment, the normal and abnormality judgment of the torque signal is performed using four signals of the first to fourth torque signals $Tr_3$, $Tr_2$, $Tr_3$ and $Tr_4$. If the normal and abnormality judgment of the torque signal is performed using three signals and an abnormality occurs at two of these three signals due to a common cause, an abnormal signal indicates the same value, and this value becomes the majority, then there is a risk that this value will be mistakenly judged to be a normal value. However, by using the four signals, this misjudgment can be suppressed.

Figure 5:
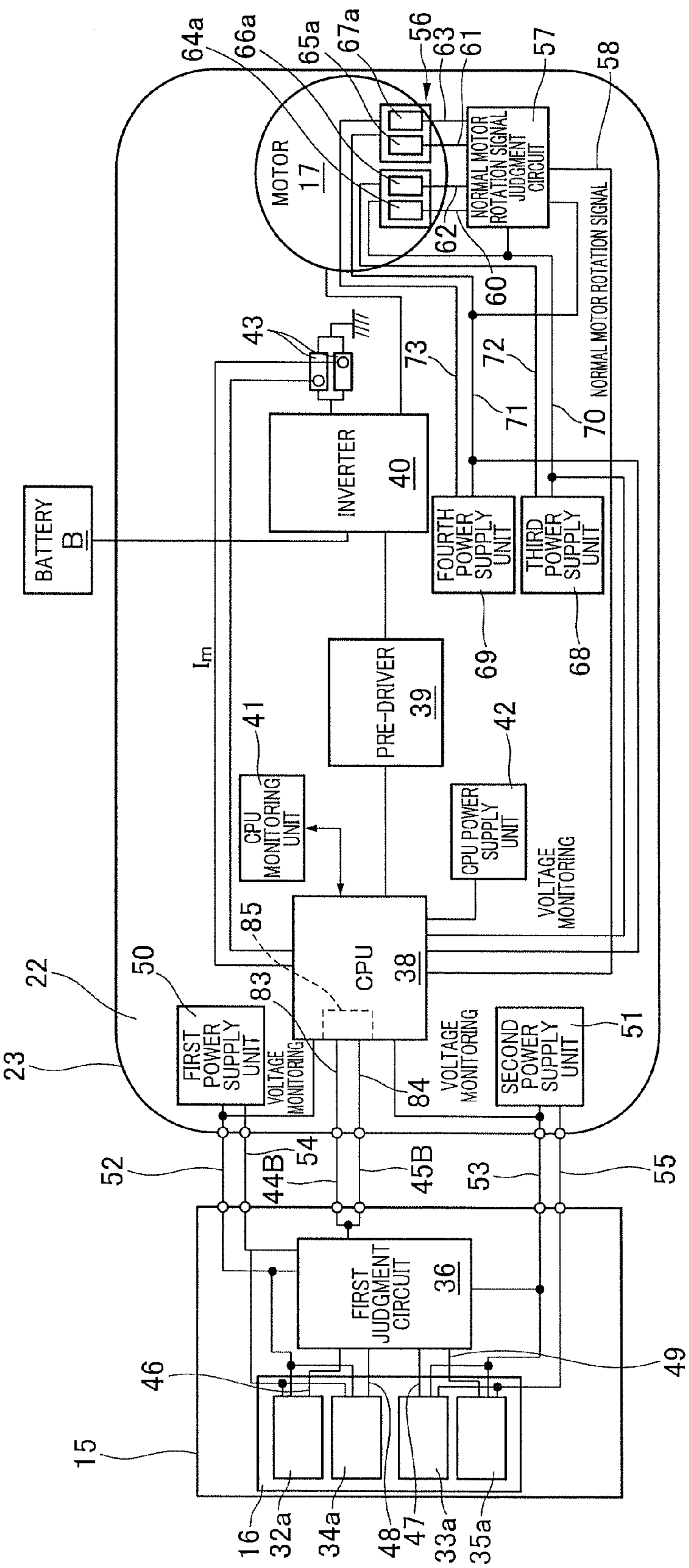
FIG. 5 is a system block diagram of the power steering device according to a second embodiment of the present invention.

FIG. 5 shows a second embodiment of the power steering device of the present invention. In this embodiment, instead of the first signal line 44A and the second signal line 45A that transmit the two torque signals in the embodiment of FIG. 3, one torque signal is transmitted from the first judgment circuit 36 to the CPU 38 through the two signal lines formed by a first signal line 44B and a second signal line 45B.

Here, a case, which is the same as the embodiment of FIG. 3, where the signal difference $D_1$ is smaller than the first threshold value α and the signal difference $D_2$ is equal to or greater than the first threshold value α when the first and third torque signals $Tr_1$ and $Tr_3$ are compared and the second and fourth torque signals $Tr_2$ and $Tr_4$ are compared, will be explained. In this case, although it is judged that both of the first and third torque signals $Tr_1$ and $Tr_3$ are normal, an arbitrary one of these normal torque signals $Tr_1$ and $Tr_3$ is outputted from the first judgment circuit 36 as the normal torque signal Trn. Further, the normal torque signal Trn is outputted to the first and second output signal receiving units 83 and 84 in the control device 22 through both of the first signal line 44B and the second signal line 45B. At this time, the second and fourth torque signals $Tr_2$ and $Tr_4$, either one of which is the abnormal torque signal, are not used.

Here, in the same manner as the embodiment of FIG. 3, in the above case, by comparing the first and third torque signals $Tr_1$ and $Tr_3$ which have been judged to be the normal torque signals with the second and fourth torque signals $Tr_2$ and $Tr_4$, either one of which is the abnormal torque signal, the abnormal torque signal could be determined. Therefore, an arbitrary one of the three signals of the first and third torque signals $Tr_1$ and $Tr_3$ and either one of the second and fourth torque signals $Tr_2$ and $Tr_4$ which is judged to be normal could be outputted to the first and second output signal receiving units 83 and 84 through the first signal line 44B and the second signal line 45B.

Further, if three or more detection elements are provided, since the abnormal torque signal can be determined by majority operation in the same manner as the embodiment of FIG. 3, an arbitrary one normal torque signal Trn could be transmitted through the first signal line 44B and the second signal line 45B.

Here, the normal torque signal (an output signal) Trn from the first signal line 44B and the normal torque signal (an output signal) Trn from the second signal line 45B are serial data signals having predetermined plurality of data that indicate a vehicle operation condition between a trigger pulse indicating a start of communication and an end pulse indicating an end of the communication, e.g. a data signal using SPC (Short PWM Codes). The predetermined plurality of data include, for instance, status information concerning the detection element at a top of a string of the date. The CPU 38 has a second judgment circuit 85 that detects an abnormality of the two normal torque signals Trn and Trn from the two signal lines 44B and 45B. This second judgment circuit 85 detects the abnormality by detecting an absence of at least one of the plurality of data in the normal torque signal Trn of the first signal line 44B or the normal torque signal Trn of the second signal line 45B, or by detecting a disaccord of an order of the plurality of data.

Therefore, also by this embodiment, it is possible to lighten the operation load of the CPU 38 and improve the safety of the device.

Figure 6:
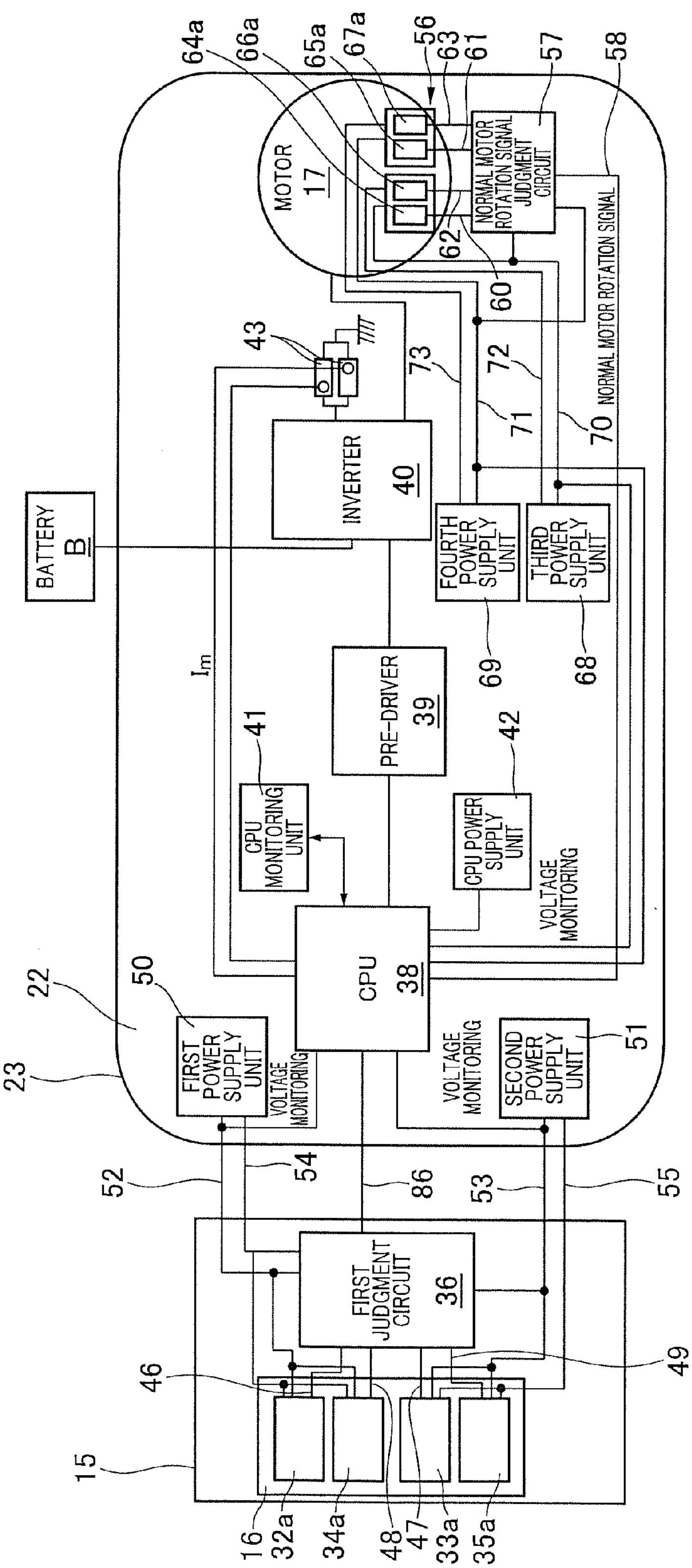
FIG. 6 is a system block diagram of the power steering device according to a third embodiment of the present invention.

FIG. 6 shows a third embodiment of the power steering device of the present invention. In this embodiment, instead of the first signal line 44A and the second signal line 45A in the embodiment of FIG. 3, the first judgment circuit 36 and the CPU 38 are connected through a single signal line 86. In the present embodiment, since the single signal line 86 is used, the signal comparison circuit 74 and the signal abnormality judgment circuit 75 shown in FIG. 3 can be omitted.

Further, since the signal line 86 is a single signal line that outputs one normal torque signal Trn which is judged to be normal in the first judgment circuit 36 to the CPU 38, the normal and abnormality judgment of the torque signal in the first judgment circuit 36 is the same as that of the embodiment of FIG. 5.

Therefore, also by this embodiment, it is possible to lighten the operation load of the CPU 38.

Although each embodiment shows, as an example, that the present invention is applied to the power steering device of the vehicle, the present invention can be applied to a control device for an on-board device (a vehicle-mounted device), which has an actuator, except for the power steering device.

Further, in each embodiment, regarding the quadruple torque sensor 16 at the sensor housing 15 side, the normal and abnormality judgment of the torque signal is made at the upstream side with respect to the CPU 38. Also regarding the quadruple motor rotation sensor 56 at the electric motor 17 side, the normal and abnormality judgment of the motor rotation signal is made at the upstream side with respect to the CPU 38. However, the abnormality judgment of only either one of the quadruple torque sensor 16 or the quadruple motor rotation sensor 56 could be made at the upstream side, then the quadruple torque sensor 16 and/or the quadruple motor rotation sensor 56 could be connected to the CPU 38 through a few lines.

Furthermore, each embodiment shows, as an example, that the four torque signals $Tr_1$, $Tr_2$, $Tr_3$ and $Tr_4$ are detected using the four torque detection elements 32*a*, 33*a*, 34*a* and 35*a* of the quadruple torque sensor 16. However, four torque signals $Tr_1$, $Tr_2$, $Tr_3$ and $Tr_4$ outputted through a plurality of different electronic circuits after being detected by one common detection element might be used.

The power steering device based on the above explained embodiments includes, for instance, the following.

As one aspect of the present invention, a power steering device comprises: a steering mechanism by which steered wheels are steered according to a steering operation of a steering wheel; an electric motor providing a steering force to the steering mechanism; a control device having a first microprocessor and controlling and driving the electric motor; a steering state detection unit provided at the steering mechanism or the electric motor and detecting a steering state; a second microprocessor provided between the steering state detection unit and the control device; a first judgment circuit provided in the second microprocessor; a first judgment circuit output signal receiving unit provided in the control device and inputting an output signal of the first judgment circuit; and a motor command signal calculation unit provided in the control device. The steering state detection unit is configured to output a plurality of signals outputted from a plurality of detection elements or output a first signal, a second signal and a third signal that are a plurality of signals outputted through a plurality of different electronic circuits after being detected by a common detection element. The first judgment circuit is configured to judge whether the first signal, the second signal and the third signal are normal or abnormal by comparing the first signal, the second signal and the third signal. The motor command signal calculation unit is configured to calculate and output a command signal to the electric motor according to a signal, which is judged to be normal by the first judgment circuit, of the first signal, the second signal and the third signal.

As a preferable aspect of the power steering device, the power steering device further comprises: a first housing accommodating therein the control device; a second housing accommodating therein the second microprocessor; and a signal line connecting the first housing and the second housing and transmitting the output signal of the first judgment circuit to the control device.

As another preferable aspect of the power steering device, in any of the above aspects of the power steering device, the signal line includes a first signal line and a second signal line.

As a further preferable aspect of the power steering device, in any of the above aspects of the power steering device, the output signal of the first signal line and the output signal of the second signal line are serial data signals having predetermined plurality of data that indicate a vehicle operation condition between a trigger pulse indicating a start of communication and an end pulse indicating an end of the communication, and the first microprocessor has a second judgment circuit configured to detect an abnormality of the output signal of the first signal line or the output signal of the second signal line by detecting an absence of at least one of the plurality of data in the output signal of the first signal line or the output signal of the second signal line or by detecting a disaccord of an order of the plurality of data.

As a further preferable aspect of the power steering device, in any of the above aspects of the power steering device, the first signal is transmitted to the control device by the first signal line, the second signal is transmitted to the control device by the second signal line, and the control device has an abnormality judgment circuit configured to, by selecting two signals from the first signal, the second signal and the third signal and comparing the two signals, judge whether the two signals are normal or abnormal.

As a further preferable aspect of the power steering device, in any of the above aspects of the power steering device, the steering state detection unit is configured to output a fourth signal detected by the detection element for detecting the first signal, the second signal and the third signal or detected by a detection element that is different from the electronic circuit or detected by the electronic circuit, and the first judgment circuit is configured to judge whether the first signal, the second signal, the third signal and the fourth signal are normal or abnormal.

As a further preferable aspect of the power steering device, in any of the above aspects of the power steering device, the signal line is at least a signal transmission line that transmits the output signal of the first judgment circuit to the control device, and the power steering device further comprises: at least two power supply lines supplying power from a control device side to the second microprocessor; and two ground lines for earth.

As a further preferable aspect of the power steering device, in any of the above aspects of the power steering device, the first judgment circuit is connected to a first power supply unit that is supplied with power from a first power supply and also connected to a second power supply unit that is supplied with power from a second power supply that is different from the first power supply.

As a further preferable aspect of the power steering device, in any of the above aspects of the power steering device, the power from the first power supply is supplied to the detection element, which detects the first signal, of the steering state detection unit or supplied to the electronic circuit, and the power from the second power supply is supplied to the detection element, which detects the second signal, of the steering state detection unit or supplied to the electronic circuit.

As a further preferable aspect of the power steering device, in any of the above aspects of the power steering device, the control device has first power supply abnormality detection circuit that detects an abnormality of the first power supply and a second power supply abnormality detection circuit that detects an abnormality of the second power supply.

Except for the power steering device, as a control device for a vehicle-mounted device having an actuator based on the above embodiments, the following aspects are raised.

As one aspect of the present invention, a control device for a vehicle-mounted device having an actuator comprises: a control device having a first microprocessor and controlling and driving the actuator; an operating condition detection unit provided at the vehicle-mounted device and detecting an operating condition of a vehicle; a second microprocessor provided between the operating condition detection unit and the control device; a first judgment circuit provided in the second microprocessor; a first judgment circuit output signal receiving unit provided in the control device and inputting an output signal of the first judgment circuit; and an actuator command signal calculation unit provided in the control device. The operating condition detection unit is configured to output a plurality of signals outputted from a plurality of detection elements or output a first signal, a second signal and a third signal that are a plurality of signals outputted through a plurality of different electronic circuits after being detected by a common detection element. The first judgment circuit is configured to judge whether the first signal, the second signal and the third signal are normal or abnormal by comparing the first signal, the second signal and the third signal. The actuator command signal calculation unit is configured to calculate and output a command signal to the actuator according to a signal, which is judged to be normal by the first judgment circuit, of the first signal, the second signal and the third signal.

As a preferable aspect of the control device for the vehicle-mounted device, the control device for the vehicle-mounted device further comprises: a first housing accommodating therein the control device; a second housing accommodating therein the second microprocessor; and a signal line connecting the first housing and the second housing and transmitting the output signal of the first judgment circuit to the control device.

As another preferable aspect of the control device for the vehicle-mounted device, in any of the above aspects of the control device for the vehicle-mounted device, the signal line includes a first signal line and a second signal line.

As a further preferable aspect of the control device for the vehicle-mounted device, in any of the above aspects of the control device for the vehicle-mounted device, the output signal of the first signal line and the output signal of the second signal line are serial data signals having predetermined plurality of data that indicate a vehicle operation condition between a trigger pulse indicating a start of communication and an end pulse indicating an end of the communication, and the first microprocessor has a second judgment circuit configured to detect an abnormality of the output signal of the first signal line or the output signal of the second signal line by detecting an absence of at least one of the plurality of data in the output signal of the first signal line or the output signal of the second signal line or by detecting a disaccord of an order of the plurality of data.

As a further preferable aspect of the control device for the vehicle-mounted device, in any of the above aspects of the control device for the vehicle-mounted device, the first signal is transmitted to the control device by the first signal line, the second signal is transmitted to the control device by the second signal line, and the control device has an abnormality judgment circuit configured to, by selecting two signals from the first signal, the second signal and the third signal and comparing the two signals, judge whether the two signals are normal or abnormal.

As a further preferable aspect of the control device for the vehicle-mounted device, in any of the above aspects of the control device for the vehicle-mounted device, the operating condition detection unit is configured to output a fourth signal detected by the detection element for detecting the first signal, the second signal and the third signal or detected by a detection element that is different from the electronic circuit or detected by the electronic circuit, and the first judgment circuit is configured to judge whether the first signal, the second signal, the third signal and the fourth signal are normal or abnormal.

As a further preferable aspect of the control device for the vehicle-mounted device, in any of the above aspects of the control device for the vehicle-mounted device, the signal line is at least a signal transmission line that transmits the output signal of the first judgment circuit to the control device, and the control device for the vehicle-mounted device further comprises: at least two power supply lines supplying power from a control device side to the second microprocessor; and two ground lines for earth.

As a further preferable aspect of the control device for the vehicle-mounted device, in any of the above aspects of the control device for the vehicle-mounted device, the first judgment circuit is connected to a first power supply unit that is supplied with power from a first power supply and also connected to a second power supply unit that is supplied with power from a second power supply that is different from the first power supply.

As a further preferable aspect of the control device for the vehicle-mounted device, in any of the above aspects of the control device for the vehicle-mounted device, the power from the first power supply is supplied to the detection element, which detects the first signal, of the operating condition detection unit or supplied to the electronic circuit, and the power from the second power supply is supplied to the detection element, which detects the second signal, of the operating condition detection unit or supplied to the electronic circuit.

As a further preferable aspect of the control device for the vehicle-mounted device, in any of the above aspects of the control device for the vehicle-mounted device, the control device has first power supply abnormality detection circuit that detects an abnormality of the first power supply and a second power supply abnormality detection circuit that detects an abnormality of the second power supply.

The invention claimed is:

1. A power steering device comprising:

a steering mechanism by which steered wheels are steered according to a steering operation of a steering wheel;

an electric motor providing a steering force to the steering mechanism;

a control device having a first microprocessor and controlling and driving the electric motor;

a steering state detection unit provided at the steering mechanism or the electric motor and detecting a steering state, the steering state detection unit configured to output a plurality of signals outputted from a plurality of detection elements or output a first signal, a second signal and a third signal that are a plurality of signals outputted through a plurality of different electronic circuits after being detected by a common detection element;

a second microprocessor provided between the steering state detection unit and the control device;

a first judgment circuit provided in the second microprocessor, the first judgment circuit configured to input the first signal, the second signal and the third signal and judge whether the first signal, the second signal and the third signal are normal or abnormal by comparing the first signal, the second signal and the third a first judgment circuit output signal receiving unit provided in the control device, the first judgment circuit output signal receiving unit configured to input an output signal of the first judgment circuit; and a motor command signal calculation unit provided in the control device, the motor command signal calculation unit configured to calculate and output a command signal to the electric motor according to a signal, which is judged to be normal by the first judgment circuit, of the first signal, the second signal and the third signal.

2. The power steering device as claimed in claim 1, further comprising:

a first housing accommodating therein the control device;

a second housing accommodating therein the second microprocessor; and a signal line connecting the first housing and the second housing and transmitting the output signal of the first judgment circuit to the control device.

3. The power steering device as claimed in claim 2, wherein:

the signal line includes a first signal line and a second signal line.

4. The power steering device as claimed in claim 3, wherein:

the output signal of the first signal line and the output signal of the second signal line are serial data signals having predetermined plurality of data that indicate a vehicle operation condition between a trigger pulse indicating a start of communication and an end pulse indicating an end of the communication, and the first microprocessor has a second judgment circuit configured to detect an abnormality of the output signal of the first signal line or the output signal of the second signal line by detecting an absence of at least one of the plurality of data in the output signal of the first signal line or the output signal of the second signal line or by detecting a disaccord of an order of the plurality of data.

5. The power steering device as claimed in claim 3, wherein:

the first signal is transmitted to the control device by the first signal line, the second signal is transmitted to the control device by the second signal line, and the control device has an abnormality judgment circuit configured to, by selecting two signals from the first signal, the second signal and the third signal and comparing the two signals, judge whether the two signals are normal or abnormal.

6. The power steering device as claimed in claim 2, wherein:

the steering state detection unit is configured to output a fourth signal detected by the detection element for detecting the first signal, the second signal and the third signal or detected by a detection element that is different from the electronic circuit or detected by the electronic circuit, and the first judgment circuit is configured to judge whether the first signal, the second signal, the third signal and the fourth signal are normal or abnormal.

7. The power steering device as claimed in claim 6, wherein:

the signal line is at least a signal transmission line that transmits the output signal of the first judgment circuit to the control device, and the power steering device further comprising:

at least two power supply lines supplying power from a control device side to the second microprocessor; and two ground lines for earth.

8. The power steering device as claimed in claim 1, wherein:

the first judgment circuit is connected to a first power supply unit that is supplied with power from a first power supply and also connected to a second power supply unit that is supplied with power from a second power supply that is different from the first power supply.

9. The power steering device as claimed in claim 8, wherein:

the power from the first power supply is supplied to the detection element, which detects the first signal, of the steering state detection unit or supplied to the electronic circuit, and the power from the second power supply is supplied to the detection element, which detects the second signal, of the steering state detection unit or supplied to the electronic circuit.

10. The power steering device as claimed in claim 8, wherein:

the control device has first power supply abnormality detection circuit that detects an abnormality of the first power supply and a second power supply abnormality detection circuit that detects an abnormality of the second power supply.

11. A control device for a vehicle-mounted device having an actuator comprising:

a control device having a first microprocessor and controlling and driving the actuator;

an operating condition detection unit provided at the vehicle-mounted device and detecting an operating condition of a vehicle, the operating condition detection unit configured to output a plurality of signals outputted from a plurality of detection elements or output a first signal, a second signal and a third signal that are a plurality of signals outputted through a plurality of different electronic circuits after being detected by a common detection element;

a second microprocessor provided between the operating condition detection unit and the control device;

a first judgment circuit provided in the second microprocessor, the first judgment circuit configured to input the first signal, the second signal and the third signal and judge whether the first signal, the second signal and the third signal are normal or abnormal by comparing the first signal, the second signal and the third signal;

a first judgment circuit output signal receiving unit provided in the control device, the first judgment circuit output signal receiving unit configured to input an output signal of the first judgment circuit; and an actuator command signal calculation unit provided in the control device, the actuator command signal calculation unit configured to calculate and output a command signal to the actuator according to a signal, which is judged to be normal by the first judgment circuit, of the first signal, the second signal and the third signal.

12. The control device for the vehicle-mounted device as claimed in claim 11, further comprising:

a first housing accommodating therein the control device;

a second housing accommodating therein the second microprocessor; and a signal line connecting the first housing and the second housing and transmitting the output signal of the first judgment circuit to the control device.

13. The control device for the vehicle-mounted device as claimed in claim 12, wherein:

the signal line includes a first signal line and a second signal line.

14. The control device for the vehicle-mounted device as claimed in claim 13, wherein:

the output signal of the first signal line and the output signal of the second signal line are serial data signals having predetermined plurality of data that indicate a vehicle operation condition between a trigger pulse indicating a start of communication and an end pulse indicating an end of the communication, and the first microprocessor has a second judgment circuit configured to detect an abnormality of the output signal of the first signal line or the output signal of the second signal line by detecting an absence of at least one of the plurality of data in the output signal of the first signal line or the output signal of the second signal line or by detecting a disaccord of an order of the plurality of data.

15. The control device for the vehicle-mounted device as in claim 13, wherein:

the first signal is transmitted to the control device by the first signal line, the second signal is transmitted to the control device by the second signal line, and the control device has an abnormality judgment circuit configured to, by selecting two signals from the first signal, the second signal and the third signal and comparing the two signals, judge whether the two signals are normal or abnormal.

16. The control device for the vehicle-mounted device as claimed in claim 12, wherein:

the operating condition detection unit is configured to output a fourth signal detected by the detection element for detecting the first signal, the second signal and the third signal or detected by a detection element that is different from the electronic circuit or detected by the electronic circuit, and the first judgment circuit is configured to judge whether the first signal, the second signal, the third signal and the fourth signal are normal or abnormal.

17. The control device for the vehicle-mounted device as claimed in claim 16, wherein:

the signal line is at least a signal transmission line that transmits the output signal of the first judgment circuit to the control device, and the control device for the vehicle-mounted device further comprising:

at least two power supply lines supplying power from a control device side to the second microprocessor; and two ground lines for earth.

18. The control device for the vehicle-mounted device as claimed in claim 11, wherein:

the first judgment circuit is connected to a first power supply unit that is supplied with power from a first power supply and also connected to a second power supply unit that is supplied with power from a second power supply that is different from the first power supply.

19. The control device for the vehicle-mounted device in claim 18, wherein:

the power from the first power supply is supplied to the detection element, which detects the first signal, of the operating condition detection unit or supplied to the electronic circuit, and the power from the second power supply is supplied to the detection element, which detects the second signal, of the operating condition detection unit or supplied to the electronic circuit.

20. The control device for the vehicle-mounted device in claim 18, wherein:

the control device has first power supply abnormality detection circuit that detects an abnormality of the first power supply and a second power supply abnormality detection circuit that detects an abnormality of the second power supply.

* * * * *